(12) United States Patent
Liang et al.

(10) Patent No.: US 9,948,686 B2
(45) Date of Patent: Apr. 17, 2018

(54) METHOD AND APPARATUS FOR SHARING DLNA DEVICE

(71) Applicant: ZTE CORPORATION, Shenzhen, Guangdong Province (CN)

(72) Inventors: Jiehui Liang, Shenzhen (CN); Fajie Zhao, Shenzhen (CN); Changlei Liu, Shenzhen (CN)

(73) Assignee: ZTE CORPORATION (CN)

( * ) Notice: Subject to any disclaimer, the term of this patent is extended or adjusted under 35 U.S.C. 154(b) by 134 days.

(21) Appl. No.: 14/398,279

(22) PCT Filed: Jul. 12, 2013

(86) PCT No.: PCT/CN2013/079309
§ 371 (c)(1),
(2) Date: Oct. 31, 2014

(87) PCT Pub. No.: WO2013/178142
PCT Pub. Date: Dec. 5, 2013

(65) Prior Publication Data
US 2015/0089025 A1    Mar. 26, 2015

(30) Foreign Application Priority Data
Aug. 15, 2012   (CN) .......................... 2012 1 0290213

(51) Int. Cl.
*H04L 29/06*   (2006.01)
*H04L 29/08*   (2006.01)
(Continued)

(52) U.S. Cl.
CPC ...... *H04L 65/1069* (2013.01); *H04L 12/2818* (2013.01); *H04L 12/2832* (2013.01);
(Continued)

(58) Field of Classification Search
None
See application file for complete search history.

(56) References Cited

U.S. PATENT DOCUMENTS

2007/0211734 A1*  9/2007  Yang ................... H04L 12/2818
                                                          370/401
2007/0237115 A1   10/2007  Bac et al.
(Continued)

FOREIGN PATENT DOCUMENTS

CN        102244654 A    11/2011
CN        102340496 A    2/2012
(Continued)

OTHER PUBLICATIONS

European Search Report dated Jun. 15, 2015 of European patent Application No. 13796843.4.
(Continued)

*Primary Examiner* — Thomas Dailey
(74) *Attorney, Agent, or Firm* — Plumsea Law Group, LLC (57) ABSTRACT

A method and an apparatus for sharing a DLNA device are provided. The method includes: establishing a data channel between a first DLNA gateway in a first DLNA network and a second DLNA gateway in a second DLNA network, wherein the DLNA gateway is a DLNA device having a DMC function and capable of accessing the Internet; adding, in the second DLNA gateway, a virtual DLNA device corresponding to a DLNA device in the first DLNA network; and a DLNA device in the second DLNA network performing remote control and/or remote play for the DLNA device in the first DLNA network through the virtual DLNA device. With the provided schemes, the problem in related technologies that DLNA sharing is only limited in a local range is solved, cross-network remote control and remote play are implemented, a sharing range of the DLNA network is expanded, and the user experience is improved.

15 Claims, 4 Drawing Sheets

(51) Int. Cl.
*H04L 12/28* (2006.01)
*H04L 12/46* (2006.01)

(52) U.S. Cl.
CPC ...... *H04L 12/4604* (2013.01); *H04L 65/1023* (2013.01); *H04L 67/02* (2013.01); *H04L 67/04* (2013.01); *H04L 67/08* (2013.01); *H04L 67/125* (2013.01); *H04L 67/16* (2013.01); *H04L 67/2861* (2013.01); *H04L 67/2876* (2013.01)

(56) References Cited

U.S. PATENT DOCUMENTS

| | | | | |
|---|---|---|---|---|
| 2007/0288632 | A1* | 12/2007 | Kanaparti | H04L 12/12 709/224 |
| 2008/0235358 | A1* | 9/2008 | Moribe | H04L 12/2832 709/220 |
| 2011/0282966 | A1* | 11/2011 | Ogawa | H04L 12/66 709/217 |
| 2012/0011222 | A1* | 1/2012 | Yasukawa | H04L 67/16 709/217 |
| 2012/0023238 | A1* | 1/2012 | Bouthemy | H04L 65/1016 709/227 |

FOREIGN PATENT DOCUMENTS

| | | |
|---|---|---|
| CN | 102480461 A | 5/2012 |
| CN | 102811223 A | 12/2012 |

OTHER PUBLICATIONS

Shingji Motegi, et al.; Proposal on Wide area DLNA Communication System; Consumer Communication and Networking Conference, 2008, CCNC 2008, 5th IEEE, Piscataway, NJ, USA, pp. 235-236.

* cited by examiner

METHOD AND APPARATUS FOR SHARING DLNA DEVICE

CLAIM FOR PRIORITY AND CROSS-REFERENCE TO RELATED APPLICATION

This application is the U.S. National Phase application of PCT application number PCT/CN2013/079309 having a PCT filing date of Jul. 12, 2013, which claims priority of Chinese patent application 201210290213.3 filed on Aug. 15, 2012, the disclosures of which are hereby incorporated by reference.

TECHNICAL FIELD

The present document relates to the field of communications, and in particular, to a method and apparatus for sharing a Digital Living Network Alliance (DLNA for short) device.

BACKGROUND OF THE RELATED ART

The Digital Living Network Alliance (DLNA for short) is a nonprofit organization initiated by SONY, Intel and Microsoft, and aims to solve the sharing of digital media contents between consumer electronic devices. The DLNA uses a Universal Plug and Play (UPnP for short) protocol to discover, describe and control devices. On basis of this, various roles of the DLNA device are defined: a Digital Media Server (DMS for short), a Digital Media Player (DMP for short), a Digital Media Controller (DMC for short), and a Digital Media Renderer (DMR for short).

The DMS and DMR, as basic device types of the UPnP, may broadcast its own online information and description information to the network through a Simple Service Discovery Protocol (SSDP for short), so as to enable the DMC to play the media contents shared by the DMS on the DMR or enable the DMP to play the media contents shared on the DMS. The communication protocol therebetween may be a HyperText Transfer Protocol (HTTP for short), and may be carried by using a User Datagram Protocol (UDP for short) or a Transmission Control Protocol (TCP for short), for example, the SSDP uses HTTP over UDP, and HTTP over TCP is used to acquire the device description information and service description information as well as subsequent device control.

The DLNA network generally is a local area network environment in a home environment, or an operating network or public network of the same subnet, and the method for sharing media resources of the DLNA cannot be used currently for the wide area network or a network of different subnets. Therefore, the DLNA sharing is only limited in a local range, it is not expanded to sharing on the internet, and it cannot be more widely applied.

There is no effective solutions currently for the problem in the related technologies that the DLNA sharing is only limited in a local range.

SUMMARY OF THE INVENTION

The embodiments of the present invention provide a method and apparatus for sharing a DLNA device, to solve the problem in the related technologies that the DLNA sharing is only limited in a local range.

According to an aspect of the embodiments of the present invention, a method for sharing a Digital Living Network Alliance (DLNA) device is provided, comprising: establishing a data channel between a first DLNA gateway in a first DLNA network and a second DLNA gateway in a second DLNA network, wherein the DLNA gateway is a DLNA device having a DMC function and capable of accessing the Internet; adding, in the second DLNA gateway, a virtual DLNA device corresponding to a DLNA device in the first DLNA network; and a DLNA device in the second DLNA network performing remote control and/or remote play for the DLNA device in the first DLNA network through the virtual DLNA device.

Alternatively, the step of a DLNA device in the second DLNA network performing remote control and/or remote play for the DLNA device in the first DLNA network through the virtual DLNA device comprises: in a case that the DLNA device in the second DLNA network controls the virtual DLNA device, the second DLNA gateway controlling the virtual DLNA device through the data channel; and/or in a case that the DLNA device in the second DLNA network plays media resources in the virtual DLNA device, the second DLNA gateway acquiring the media resources of the DLNA device in the first DLNA network corresponding to the virtual DLNA device through the data channel and playing the media resources.

Alternatively, the step of establishing a data channel between a first DLNA gateway in a first DLNA network and a second DLNA gateway in a second DLNA network comprises: establishing a data channel between the first DLNA gateway and the second DLNA gateway through an XMPP server.

Alternatively, establishing a data channel between the first DLNA gateway and the second DLNA gateway through an XMPP server comprises: the first DLNA gateway and the second DLNA gateway logging in the XMPP server using the same account; and the first DLNA gateway and the second DLNA gateway establishing the data channel.

Alternatively, the method further comprises: the first DLNA gateway and/or the second DLNA gateway logging out the account; and the second DLNA gateway broadcasting that the virtual DLNA device leaves the second DLNA network in the second DLNA network through an SSDP message.

Alternatively, the step of adding, in the second DLNA gateway, a virtual DLNA device corresponding to a DLNA device in the first DLNA network comprises: the first DLNA gateway transmitting the SSDP message broadcasted by the DLNA device in the first DLNA network to the second DLNA gateway through the data channel; and the second DLNA gateway adding the virtual DLNA device corresponding to the DLNA device, amending the SSDP message broadcast by the DLNA device in the first DLNA network, and broadcasting the amended SSDP message in the second DLNA network.

Alternatively, the SSDP message broadcasted by the DLNA device in the first DLNA network comprises a first URL within the first DLNA network of the DLNA device in the first DLNA network, and the second DLNA gateway broadcasting the amended SSDP message in the second DLNA network comprises: the second DLNA gateway amending the first URL in the SSDP message to a second URL within the second DLNA network of the second DLNA gateway as a URL of the virtual DLNA device, and broadcasting the amended SSDP message in the second DLNA network.

Alternatively, the data channel is a UDP based data channel.

Alternatively, the step of the DLNA device in the second DLNA network performing remote control and/or remote play for the DLNA device in the first DLNA network through the virtual DLNA device comprises: the second DLNA gateway transforming a message for remote control and/or remote play transmitted by the DLNA device in the second DLNA network to the virtual DLNA device from an HTTP format into an UDP format, and transmitting the transformed message to the first DLNA gateway through the data channel; and the second DLNA gateway transforming a response message corresponding to the message returned by the first DLNA gateway from the UDP format into the HTTP format, and forwarding the transformed response message to the DLNA device performing remote control and/or remote play.

According to another aspect of the embodiments of the present invention, an apparatus for sharing a DLNA device located in a second DLNA gateway of a second DLNA network is further provided, comprising: an establishment module, configured to establish a data channel with a first DLNA gateway in a first DLNA network, wherein the DLNA gateway is a DLNA device having a DMC function and capable of accessing the Internet; a processing module, configured to add a virtual DLNA device corresponding to a DLNA device in the first DLNA network; and a remote operating module, configured to operate, by the DLNA device in the second DLNA network, to perform remote control and/or remote play for the DLNA device in the first DLNA network through the virtual DLNA device.

Alternatively, the remote operating module comprises: a remote control unit, configured to control the virtual DLNA device through the data channel in a case that the DLNA device in the second DLNA network controls the virtual DLNA device; and/or a remote play unit, configured to acquire the media resources of the DLNA device in the first DLNA network corresponding to the virtual DLNA device through the data channel and play the media resources in a case that the DLNA device in the second DLNA network plays media resources in the virtual DLNA device.

Alternatively, the establishment module comprises: a login unit, configured to log in an XMPP server using the same account as that of the first DLNA gateway; and an establishment unit, configured to establish the data channel with the first DLNA gateway.

Alternatively, the apparatus further comprises: a logout module, configured to log out the account; and a broadcast module, configured to broadcast that the virtual DLNA device leaves the second DLNA network in the second DLNA network through an SSDP message.

Alternatively, the processing module comprises: a reception module, configured to receive the SSDP message broadcasted by the DLNA device in the first DLNA network transmitted by the first DLNA gateway through the data channel; an adding module, configured to add the virtual DLNA device corresponding to the DLNA device; and a first transformation module, configured to amend the first URL in the SSDP message to a second URL within the second DLNA network of the second DLNA gateway as a URL of the virtual DLNA device, and broadcast the amended SSDP message in the second DLNA network in a case that the SSDP message comprises a first URL within the first DLNA network of the DLNA device in the first DLNA network.

Alternatively, in a case that the data channel is a UDP based data channel, the remote operating module comprises: a second transformation module, configured to transform a message for remote control and/or remote play transmitted by the DLNA device in the second DLNA network to the virtual DLNA device from an HTTP format into an UDP format, and transmit the transformed message to the first DLNA gateway through the data channel; and further configured to transform a response message corresponding to the message returned by the first DLNA gateway from the UDP format into the HTTP format, and forward the transformed response message to the DLNA device performing remote control and/or remote play.

With the embodiments of the present invention, a data channel is established between a first DLNA gateway in a first DLNA network and a second DLNA gateway in a second DLNA network, wherein the DLNA gateway is a DLNA device having a DMC function and capable of accessing the Internet; a virtual DLNA device corresponding to a DLNA device in the first DLNA network is added in the second DLNA gateway; and a DLNA device in the second DLNA network performs remote control and/or remote play for the DLNA device in the first DLNA network through the virtual DLNA device. This solves the problem in related technologies that DLNA sharing is only limited in a local range, implements cross-network remote control and remote play, expands a sharing range of the DLNA network, and improves the user experience.

PREFERRED EMBODIMENTS OF THE PRESENT INVENTION

The embodiments of the present invention will be described in detail in conjunction with accompanying drawings hereinafter. It should be illustrated that without conflict, the embodiments in the application and the features of the embodiments can be randomly combined with each other.

Figure 1:
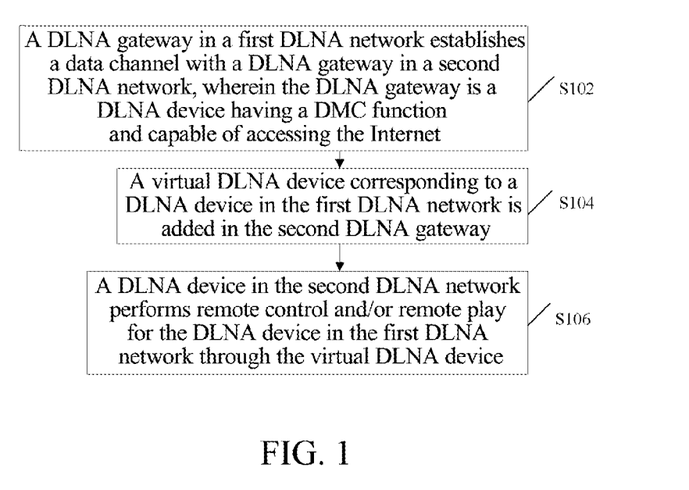
FIG. 1 is a flowchart of a method for sharing a DLNA device according an embodiment of the present invention.

A method for sharing a DLNA device is provided in the present embodiment. FIG. 1 is a flowchart of a method for sharing a DLNA device according to an embodiment of the present invention. As shown in FIG. 1, the method comprises the following steps:

In step S102, a DLNA gateway in a first DLNA network (a first DLNA gateway for short herein) establishes a data channel with a DLNA gateway in a second DLNA network (a second DLNA gateway for short herein), wherein the DLNA gateway is a DLNA device having a DMC function and capable of accessing the Internet, for example, a mobile phone, a television and a Customer Premises Equipment (CPE for short) etc.;

in the above step, the DLNA gateway in the first DLNA network may establish the data channel with the DLNA gateway in the second DLNA network when receiving a notification that the second DLNA gateway is online from a server.

In step S104, a virtual DLNA device corresponding to a DLNA device in the first DLNA network is added in the second DLNA gateway; and in step S106, a DLNA device in the second DLNA network performs remote control and/or remote play for the DLNA device in the first DLNA network through the virtual DLNA device.

With the above steps of the embodiments, after establishing a data channel between the first DLNA gateway and the second DLNA gateway, the DLNA device in the first DLNA network is presented in the second DLNA gateway by way of a virtual device, and the DLNA device in the second DLNA network performs remote control and/or remote play for the DLNA device in the first DLNA network through the virtual DLNA device, thereby implementing a remote operation on the DLNA device in the first DLNA network by the DLNA device in the second DLNA network. This enables the sharing of a DLNA device not to be limited to the interior of a single DLNA network, solves the problem in related technologies that DLNA sharing is only limited in a local range, implements cross-network remote control and remote play, expands a sharing range of the DLNA network, and improves the user experience.

It should be illustrated that "first" and "second" herein are merely for convenience of description, and are not used to define a specific order or a particular meaning. In addition, the access scheme of the DLNA device in the embodiments is not limited to being between two DLNA networks, and instead, the access of a DLNA device among multiple DLNA networks may also be implemented by the access scheme of a DLNA device in the embodiments.

As a preferable implementation, a DLNA device in the second DLNA network performing remote control and/or remote play for the DLNA device in the first DLNA network through the virtual DLNA device may be implemented by the following modes: in a case that the DLNA device in the second DLNA network controls the virtual DLNA device, the second DLNA gateway controlling the virtual DLNA device through the data channel; and in a case that the DLNA device in the second DLNA network plays media resources in the virtual DLNA device, the second DLNA gateway acquiring the media resources of the DLNA device in the first DLNA network corresponding to the virtual DLNA device through the data channel and playing the media resources. This mode is easy to operate and has a strong realizability.

There are many modes to establish the data channel between the first DLNA gateway and the second DLNA gateway in step S102, for example, the data channel may be established by way of a third-party server. As a preferable implementation, the data channel between the first DLNA gateway and the second DLNA gateway may be established through an XMPP server.

Alternatively, it may be confirmed that a user needs to implement interconnection between the first DLNA gateway and the second DLNA gateway in a case that the first DLNA gateway and the second DLNA gateway use the same account to log in the XMPP server. At this time, the XMPP server will notify information that one gateway is online to the other gateway, for example, information that a latter login gateway is online may be notified to a former login gateway, facilitating both gateways negotiating to establish a data channel therebetween, and of course, it may also be substituted with an opposite notification order. In a case that the counterpart gateway is known to be online, the first DLNA gateway and the second DLNA gateway may negotiate through an XMPP protocol to establish the data channel.

Alternatively, the data channel may be a UDP based data channel. In such case, the first DLNA gateway and the second DLNA gateway may be used as transformation devices to transform a message format between the DLNA gateway where it is located and the data channel. For example, the second DLNA gateway may transform a message for remote control and/or remote play transmitted by the DLNA device in the second DLNA network to the virtual DLNA device from a HTTP format into an UDP format, and transmit the transformed message to the first DLNA gateway through the data channel; and the second DLNA gateway transforms a response message corresponding to the message returned by the first DLNA gateway from the UDP format into the HTTP format, and forwards the transformed response message to the DLNA device performing remote control and/or remote play.

Alternatively, after the first DLNA gateway and the second DLNA gateway are connected through a data channel, if an abnormal connection occurs, or a user actively abandons interconnection between two or more DLNA gateways and there is a need to disconnect the connection, the connection may be disconnected by any one or both of the first DLNA gateway or the second DLNA gateway logging out the above account; and in such case, the DLNA gateway of the virtual DLNA device may broadcast that all virtual DLNA devices exit the DLNA network in the DLNA network where it is located through the SSDP message.

As a preferable implementation, in a case that there is a DLNA device added in the first DLNA network, the first DLNA gateway may transform the SSDP message broadcasted by the DLNA device in the first DLNA network from a multicast message into a unicast message, and transmit the message to the second DLNA gateway through the data channel; and after receiving the SSDP message, the second DLNA gateway may add the virtual DLNA device corresponding to the DLNA device, transform the SSDP message from a unicast message into a multicast message, and broadcast the SSDP message in the second DLNA network, to notify the DLNA device in the second DLNA network that there is a newly added DLNA device.

Alternatively, as the above SSDP message is transmitted by the DLNA device in the first DLNA network, a Uniform Resource Locator (URL for short) included in the SSDP message may be a URL within the first DLNA network (first URL for short herein). Therefore, in order to ensure that the DLNA device in the second DLNA network can correctly access the DLNA device in the first DLNA network, when broadcasting the SSDP message in the second DLNA network, the second DLNA gateway may amend the first URL in the SSDP message to a URL within the second DLNA network where it is located (second URL for short herein) as a URL of the virtual DLNA device, and broadcast the amended SSDP message in the second DLNA network.

With the above mode, in a case that the DLNA device in the second DLNA network accesses the virtual DLNA device in the second DLNA gateway, the DLNA device in the second DLNA network finds the second DLNA gateway according to the second URL, and the second DLNA gateway may request the first DLNA gateway through the data channel to acquire data of the DLNA device in the first DLNA network corresponding to the virtual DLNA device according to the first URL, thereby implementing acquisition of data resources of the DLNA device in the first DLNA network corresponding to the virtual device in the second DLNA gateway.

The embodiments further provide an apparatus for sharing a DLNA device corresponding to the above method. The apparatus is located in a second DLNA gateway in the second DLNA network, and is used to implement the above embodiments and preferable implementations. The description which has been set fourth will be omitted. As used below, the term "module" can implement a combination of software and/or hardware with predetermined functions. Although the apparatus described by the following embodiments is preferably implemented by software, hardware or a combination of software and hardware may also be possible and conceived.

Figure 2:
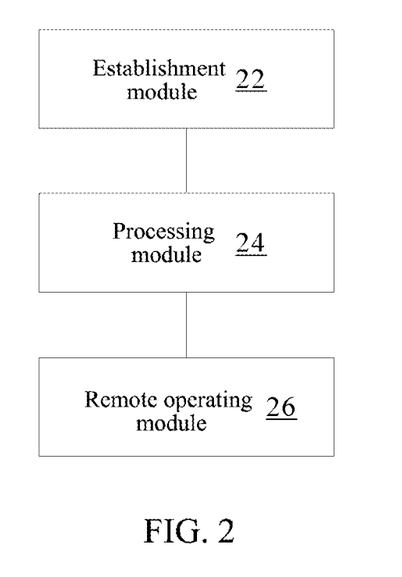
FIG. 2 is a structural block diagram of an apparatus for sharing a DLNA device according to an embodiment of the present invention.

FIG. 2 is a structural block diagram of an apparatus for sharing a DLNA device according to an embodiment of the present invention. As shown in FIG. 2, the apparatus comprises: an establishment module 22, a processing module 24 and a remote operating module 26, which will be described in detail below.

The establishment module 22 is configured to establish a data channel with a first DLNA gateway in a first DLNA network, wherein the DLNA gateway is a DLNA device having a DMC function and capable of accessing the Internet; the processing module 24 is connected to the establishment module 22 and is configured to add a virtual DLNA device corresponding to a DLNA device in the first DLNA network; and the remote operating module 26 is connected to the processing module 24 and is configured to operate, by the DLNA device in the second DLNA network, to perform remote control and/or remote play for the DLNA device in the first DLNA network through the virtual DLNA device.

With the above modules of the embodiments, after the establishment module 22 establishes a data channel between the first DLNA gateway and the second DLNA gateway, the processing module 24 presents the DLNA device in the first DLNA network in the second DLNA gateway by way of a virtual device, and the remote operating module 26 operates, by the DLNA device in the second DLNA network, to perform remote control and/or remote play for the DLNA device in the first DLNA network through the virtual DLNA device, thereby implementing a remote operation on the DLNA device in the first DLNA network by the DLNA device in the second DLNA network. This enables the sharing of a DLNA device not to be limited to the interior of a single DLNA network, solves the problem in related technologies that DLNA sharing is only limited in a local range, implements cross-network remote control and remote play, expands a sharing range of the DLNA network, and improves the user experience.

Figure 9:
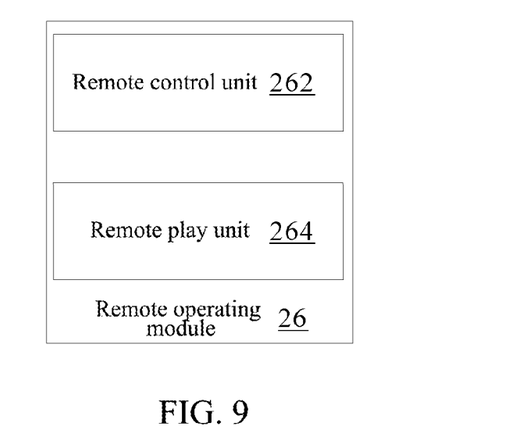
FIG. 9 is a preferred structural block diagram of a remote operating module according to an embodiment of the present invention.

FIG. 9 is a preferable structural block diagram of the remote operating module 26 according to an embodiment of the present invention. As shown in FIG. 9, the remote operating module 26 may include: a remote control unit 262, configured to control the virtual DLNA device through the data channel in a case that the DLNA device in the second DLNA network controls the virtual DLNA device; and/or a remote play unit 264, configured to acquire the media resources of the DLNA device in the first DLNA network corresponding to the virtual DLNA device through the data channel and play the media resources in a case that the DLNA device in the second DLNA network plays media resources in the virtual DLNA device.

Figure 3:
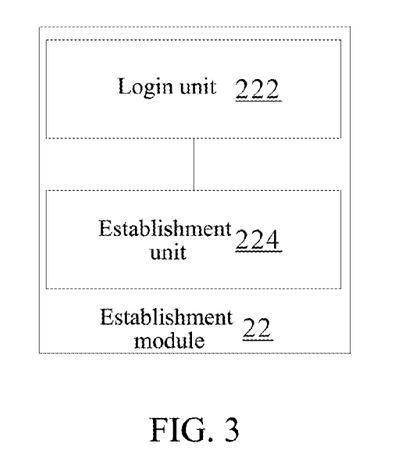
FIG. 3 is a preferred structural block diagram of an establishment module according to an embodiment of the present invention.

FIG. 3 is a preferable structural block diagram of the establishment module 22 according to an embodiment of the present invention. As shown in FIG. 3, the establishment module 22 may include: a login unit 222, configured to log in an XMPP server using the same account as that of the first DLNA gateway; and an establishment unit 224 connected to the login unit 222 and configured to establish a data channel with the first DLNA gateway.

Figure 4:
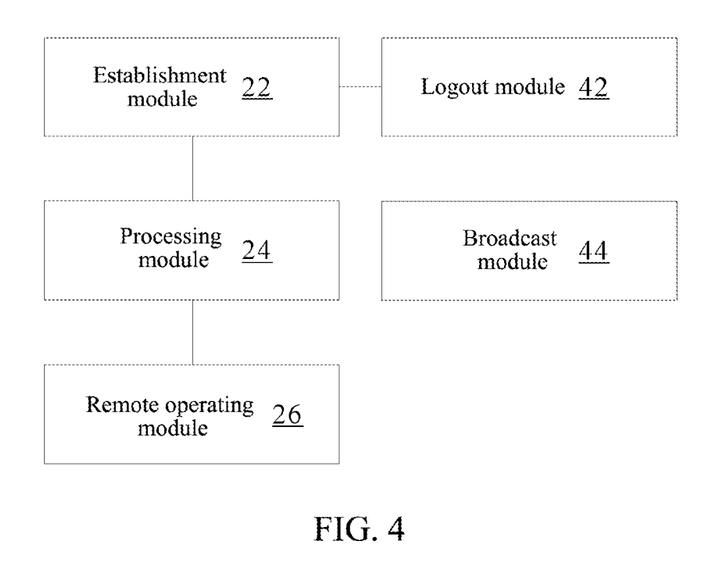
FIG. 4 is a preferred structural block diagram of an apparatus for sharing a DLNA device according to an embodiment of the present invention.

FIG. 4 is a preferable structural block diagram of an apparatus for sharing a DLNA device according to an embodiment of the present invention. As shown in FIG. 4, the apparatus may further include: a logout module 42, connected to the establishment module 22 and configured to log out the account; and a broadcast module 44 connected to the logout module 42 and configured to broadcast that the virtual DLNA device leaves the second DLNA network in the second DLNA network through an SSDP message.

Figure 5:
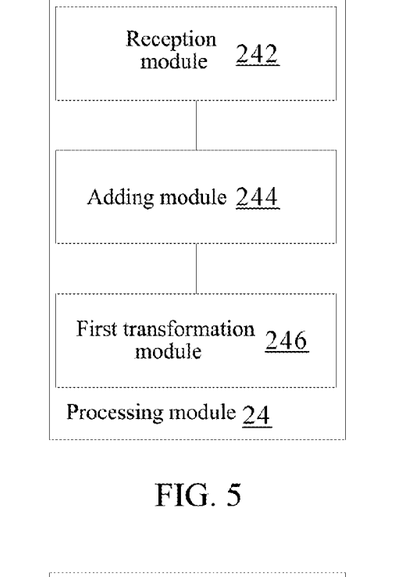
FIG. 5 is a preferred structural block diagram of a processing module according to an embodiment of the present invention.

FIG. 5 is a preferable structural block diagram of the processing module 24 according to an embodiment of the present invention. As shown in FIG. 5, the processing module 24 may include: a reception module 242, configured to receive the SSDP message broadcasted by the DLNA device in the first DLNA network transmitted by the first DLNA gateway through the data channel; an adding module 244 connected to the reception module 242 and configured to add the virtual DLNA device corresponding to the DLNA device; and a first transformation module 246 connected to the adding module 244 and configured to amend the first URL in the SSDP message to a second URL within the second DLNA network of the second DLNA gateway as a URL of the virtual DLNA device, and broadcast the amended SSDP message in the second DLNA network in a case that the SSDP message comprises a first URL within the first DLNA network of the DLNA device in the first DLNA network.

Figure 6:
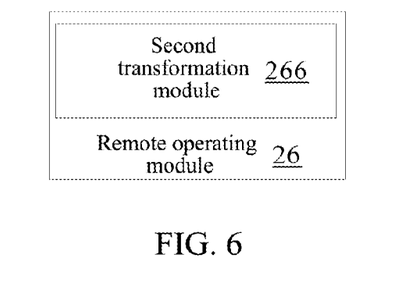
FIG. 6 is a preferred structural block diagram of an acquisition module according to an embodiment of the present invention.

FIG. 6 is a preferable structural block diagram of the remote operating module 26 according to an embodiment of the present invention. As shown in FIG. 6, in a case that the data channel is a UDP based data channel, the remote operating module 26 may include: a second transformation module 266, configured to transform a message for remote control and/or remote play transmitted by the DLNA device in the second DLNA network to the virtual DLNA device from an HTTP format into an UDP format, and transmit the transformed message to the first DLNA gateway through the data channel; and further configured to transform a response message corresponding to the message returned by the first DLNA gateway from the UDP format into the HTTP format, and forward the transformed response message to the DLNA device performing remote control and/or remote play.

The present document will be described below in conjunction with preferable embodiments. The following preferable embodiments combine the above embodiments and preferable implementations thereof.

The following preferable embodiments primarily relate to a method for interconnecting two or more digital home networks. In the following preferable embodiments, a new device type of a DLNA gateway is introduced, and interconnection among more than two DLNA networks is implemented by interconnection between two DLNA gateways. A DLNA device type (for example, DMS and DMR) of another DLNA network is virtualized in the role of the DLNA gateway device, so that the DLNA devices of different DLNA networks can find and control each other, and finally implement sharing of multimedia resources across DLNA networks and expand the DLNA sharing on the internet.

Embodiment One

Figure 7:
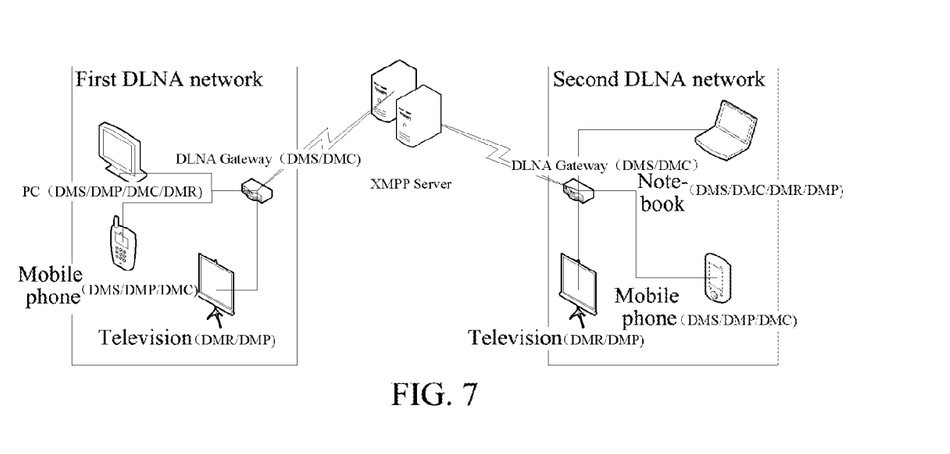
FIG. 7 is a structural diagram of interconnection between DLNA networks according to embodiment one of the present invention.

FIG. 7 is a structural diagram of interconnection between DLNA networks according to embodiment one of the present invention. As shown in FIG. 7, there is a television as a DMP and a DMR, a mobile terminal as a DMC, a DMS and a DMP, a PC with four DLNA device roles and a Customer Premises Equipment (CPE) with a DMS function in the first DLNA network. These personal customer electronic devices are connected through routers, have the IP address of the same subnet, and constitute a digital home network capable of DLNA sharing. Other DLNA networks also have similar networking structures, for example a second DLNA network shown in FIG. 7.

In order to achieve interconnection between two DLNA networks, it needs to select one from the personal customer electronic devices in digital home network as a DLNA gateway to communicate with another home network. This device is capable of accessing an XMPP server. In the preferable embodiment, a CPE device is selected to act as the device. Other devices can also be selected, for example, a mobile terminal or a television. The DLNA gateway device selected by a user needs to register an Extensible Messaging and Presence Protocol (XMPP) account on a server of the internet, and logs in the XMPP server in the embodiment of the present invention through the account. The DLNA gateways of other DLNA networks may also log in the XMPP server with the same account. As identity authentication, this XMPP account associates the DLNA gateways of different DLNA networks. Each DLNA gateway may actually have its own unique identity. The XMPP server uses identities of the DLNA gateways associated therewith as a group, in which the DLNA gateways share presentation information. Therefore, after the user logs in the DLNA gateway of the second DLNA network, the DLNA gateway of the first DLNA network can be aware of interconnection between the first DLNA network and the second DLNA network to be implemented by the user, and the XMPP server will notify information that the second DLNA gateway is online to the first DLNA gateway.

The first DLNA gateway and the second DLNA gateway may negotiate to establish a data channel using an XMPP protocol. The data channel can be used for P2P data transmission using a UDP protocol, thereby avoiding passing through the XMPP server. However, due to the problem of networking among different DLNA networks, it may need to consider the problems of Network Address Translation (NAT for short) traversal and firewalls, the UDP tunnel may require to pass through a relay so as to arrive at another DLNA gate way.

After establishing a data channel with another DLNA gateway, the DLNA gateway may transmit an SSDP message of a DLNA network where it is located to another DLNA gateway through the data channel. As described above, the SSDP uses HTTP over UDP, and the established data channel is also a UDP tunnel. Therefore, the SSDP can be directly transmitted to another DLNA gateway through the UDP tunnel, and the original multicast message needs to be changed into a unicast message. After the SSDP message of the data channel is received and parsed, virtual DMS and DMR devices of another DLNA network are added and deleted on the DLNA gateway according to whether it is a device join notification or leave notification and keep-alive notification. Device description information and service description information of the virtual DMS and DMR devices are acquired from a target DLNA gateway through a data channel. This acquisition process uses HTTP over TCP, and therefore it needs to use pseudo TCP tunnel on the UDP data channel for traffic control and transmission to transmit TCP data to another DLNA gateway through the pseudo TCP tunnel. The target DLNA gateway acquires the device description and service description information of the virtual DMS and DMR from the source DLNA gateway, and then broadcasts the information through the SSDP protocol in the DLNA network where it is located. Other DLNA devices in the DLNA network can be aware of the description information and control information of the virtual DMS and DMR devices and implement the same control and presentation as those of the DMS and DMR devices in the current DLNA network, so as to realize localized sharing of remote DMS and DMR. The local DMS and DMR devices are also similarly shared in the first DLNA network through the DLNA gateway. The DMS and DMR devices of the two DLNA networks can access each other through the DLNA gateways to realize sharing of media resources across the DLNA networks.

The media resource items shared by the virtual DMS may not have the same resource URLs as those of the resource items of the actual DMS devices. When the media resource items of the virtual DMS are accessed, the URLs thereof may be reconfigured by the DLNA gateway according to the IP address of its own. Therefore, when a resource request of a local DLNA network is received, the DLNA gateway needs to acquire resources from the target DLNA gateway through a data channel which is established before, the target DLNA gateway requests DMS resources through the HTTP protocol, and then transmits the multimedia data to the source DLNA gateway through the data channel by a protocol transformation, and the source DLNA gateway transmits the multimedia data to the related DLNA device of the local DLNA network through the HTTP protocol. The DLNA gateway acts as different DLNA device roles according to different positions where it is located, and transforms the transmission protocol. For example, the above source DLNA gateway is used as a DMS, and forwards the resource request of the virtual DMS to the target DLNA gateway; while the target DLNA gateway acts as a DMP, acquires media data of the actual DMS resources, does not perform operations, and transmits the media data to the source DLNA through the data channel.

If an abnormal connection occurs between the DLNA gateways, the virtual DMS and DMR of the two DLNA networks will be unavailable immediately, and the DLNA gateway broadcasts that the virtual DMS and DMR leave the DLNA network to its own DLNA network through the SSDP protocol. If a user actively abandons the interconnection between two DLNAs, as long as the XMPP account is logged out on one DLNA gateway, the DLNA gateway will broadcast that DMS and DMR devices of the other DLNA network leave the DLNA network through the SSDP protocol, and the other DLNA gateway broadcasts that the virtual DMS and DMR of the DLNA network leave its own DLNA network through the SSDP protocol by an offline notification of the XMPP server.

With the present preferable embodiment, a user can interconnect DLNA networks at different positions. For example, the user has its own DLNA networks at home and in workplace. When the user uses the home network in the workplace and the user's family is at home; and the user finds interested media resources to be shared to the home network at home, the user's family can see the media resources only by the user assigning the media resources to the virtual DMR of the DLNA gateway for play. Or the user uploads the media resources on the virtual DMS of the DLNA and then the user's family can also see the media resources by viewing the local DMS server. The user can remotely control the DLNA device at home, for example, playing specified media contents to the family without control by the family.

Embodiment Two

Figure 8:
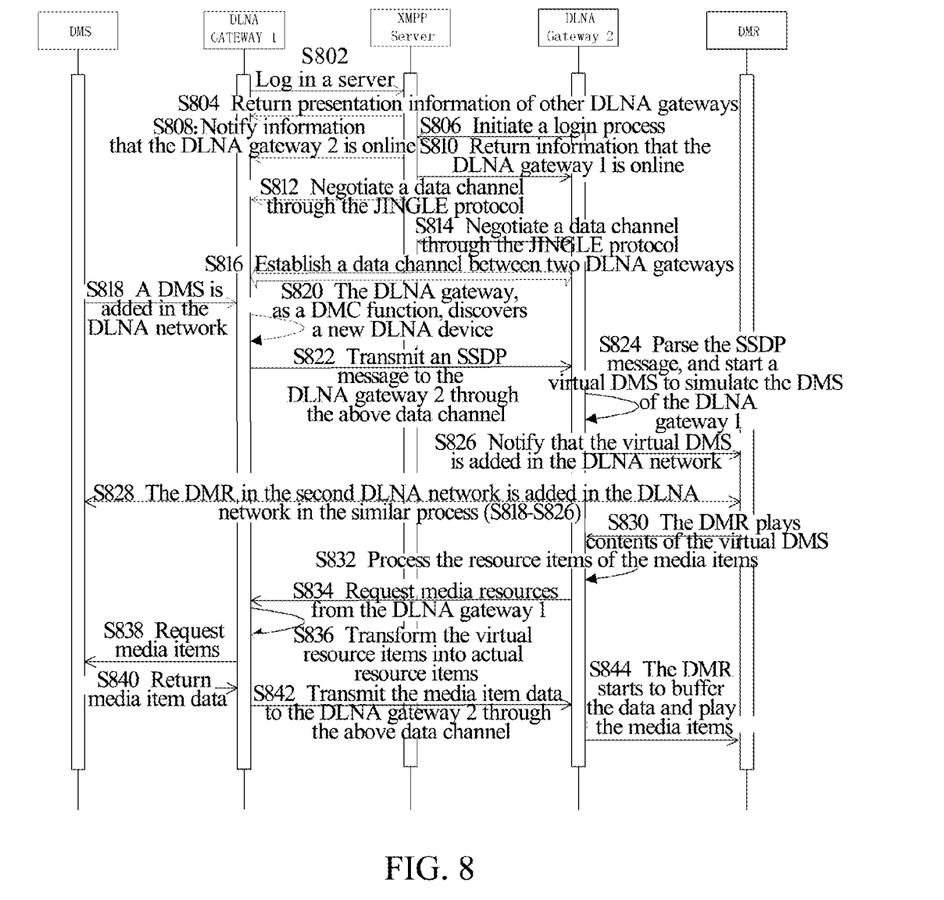
FIG. 8 is a flowchart of network interaction of interconnection between DLNA networks according to embodiment two of the present invention.

FIG. 8 is a flowchart of network interaction of interconnection between DLNA networks according to embodiment two of the present invention. As shown in FIG. 8, in order to simplification of the description, only the interaction between the DMS and the DLNA GATEWAY1 is described in the first DLNA network, and only one DMR and DLNA GATEWAY2 occur in the second DLNA network. In principle, there may be any number of DMSs and DMRs in any DLNA network. In addition, the network interconnection solution according to the present preferable embodiment may also be extended to interconnection among more than three DLNA networks. The present preferable embodiment will be described only by taking interconnection between two DLNA networks as an example. Before implementing interconnection between two DLNA networks, a user needs to apply to an XMPP server for an account, a DLNA gateway selected by the user must have a capability of internet access, and other DLNA devices in the DLNA network may not have such capability. The following description primarily relates to a flow of interaction of interconnection protocol message between two DLNA gateways, a process of device discovery in the two DLNA networks (including a local DLNA device and a virtual DLNA device) and a flow of protocol transformation and message interaction when a local DLNA terminal acquires a remote DLNA network for play. Other flows are the same as the above, and the description thereof will be omitted here.

The flow of network interaction of interconnection between DLNA networks according to the present preferable embodiment includes the following steps:

In step S802, a user uses an XMPP account in a first DLNA network to log in an XMPP server in the selected DLNA gateway 1, and the XMPP server authenticates the legality of the XMPP account, and adds a login identity associated therewith as a group, in which login identities share presentation information.

In step S804, if an XMPP server which has a login identity associated with the XMPP account has been logged in, the presentation information thereof is transmitted to the XMPP server, i.e., the user wants to interconnect with another DLNA network. In the present example, as the DLNA gateway 2 has not logged in, the XMPP server does not have the presentation information of the DLNA gateway 2.

In step S806, the DLNA gateway 2 uses the same method to log in the XMPP server.

In step S808, the XMPP server discovers that the DLNA gateway 1 associated with the XMPP account is online, and notifies the information that the DLNA gateway 2 is online to the DLNA gateway 1.

In step 810, at the same time, the XMPP server also notifies the DLNA gateway 2 of information that the DLNA gateway 1 is already online. Through the above XMPP login and presentation notification processes, the user wants to implement interconnection between the DLNA network where the DLNA gateway 1 is located and the DLNA network where the DLNA gateway 2 is located.

In step S812, the DLNA gateway 1 negotiates the data channel with the DLNA gateway 2 through an XMPP: JINGLE protocol. As the networking between the DLNA gateway 1 and the DLNA gateway 2 is complex, the above negotiation process needs to be relayed through the XMPP server. Firstly, a session is initiated to transmit a transmission method of the DLNA gateway 1 (UDP, TCP and ICE-UDP, ICE-TCP) to the DLNA gateway 2 through the XMPP server, and the DLNA gateway 2 will firstly confirm the message, and then tries to acquire a transmission method for successful connection between the DLNA gateway 2 and the DLNA gateway 1 according to the transmission method of the DLNA gateway 1. If the DLNA gateway 1 and the DLNA gateway 2 are in the same local area network and there is no any NAT traversal and firewalls, the P2P transmission may be performed through a UDP or a TCP; and if there is NAT traversal, the ICE-UDP mode may be used and the P2P transmission may be performed through a relay.

In step S814, after completing enquiry of the transmission method, the DLNA gateway 2 transmits session acceptance information through an XMPP:JINGLE protocol, and the DLNA gateway 1 confirms the information and completes negotiation of the data channel with the DLNA gateway 2.

In step S816, according to the transmission method in the above negotiation result, the DLNA gateway 1 and the DLNA gateway 2 establish the data channel, and due to the difference in networking between the DLNA gateways, the P2P transmission may be performed through a relay.

In step S818, a DMS is added in the first DLNA network, and is broadcast in the first DLNA network through the SSDP protocol.

In step S820, the DLNA gateway 1, as a DMC device role, receives an SSDP message of the DMS, and discovers that a new DLNA device is added in the local DLNA network.

In step S822, the DLNA gateway 1 encapsulates the received SSDP message into the data channel and then transmits it to the DLNA gateway 2.

In step S824, the DLNA gateway 2 parses the SSDP message, discovers that the DMS of the first DLNA network is added in the DLNA network, and acquires device description and service description information of the DMS from the first DLNA gateway through the data channel. All of these interaction processes are transmitted through the above negotiated data channel.

In step S826, the DLNA gateway 2 amends the URL of the acquired device description information and service description information of the DMS, substitutes it with a local IP address, and broadcasts an SSDP message to the second DLNA network to notify that the virtual DMS is added in the DLNA network.

In step S828, the DMR in the second DLNA network also uses the above steps S818-S826, and there is a virtual DMR in the first DLNA network. The virtual DLNA device which is added and deleted can perform remote play and remote control, for example, in the second DLNA network, the function of remote play is implemented by playing resources of the virtual DMS using the DMP/DMR; and the function of remote control is implemented by the DMC controlling the virtual DMR to play particular contents.

In step S830, in the second DLNA network, the DMC specifies the DMR to play media contents of the virtual DMS, and the DMR requests media contents from the DMS started by the DLNA gateway 2; and the there is difference between the URL of the media resource items of the virtual DMS and the URL of the media resource items of the actual DMS, the former uses an IP address of the DLNA gateway 2 as a host address, and the latter uses the current IP address as a host address.

In step S832, the DLNA gateway 2 receives a resource request of the virtual DMS, can request actual resources from the DLNA gateway 1 through Universally Unique Identifiers (UUIDs) of the actual DMS device and the virtual DMS device, and performs protocol data transformation. Different DMS and DMR devices can be distinguished globally through the UUIDs. The DLNA gateway 2 can directly access the DLNA device in the first DLNA network through the UUID.

In step S834, the resource request is transmitted to the DLNA gateway 1 through the data channel which is established before.

In step S836, at this time, the DLNA gateway 1, as a DMP device role, requests multimedia resources from the DMS.

In step S838, the DMS receives the media resource request of the DLNA gateway 1, and processes it in accordance with the local DLNA sharing.

In step S840, the DMS responds to the above HTTP request of the resources, and transmits the media resource data to the DLNA gateway 1, and the DLNA gateway 1 can performs a protocol transformation process.

In step S842, the DLNA gateway 1 transmits the HTTP response message to the DLNA gateway 2 through the data channel.

In step S844, the DLNA gateway 2 performs protocol data transformation process, transmits the media resource data to the DMR device through a standard HTTP response, and the DMR starts to buffer and play the media resource data, and finally enables the DMR of the second DLNA network to play the media resources shared by the DMS of the first DLNA network.

Alternatively, the DMS and the DLNA gateway 1 can perform a process using a standard HTTP protocol, the DLNA gateway 1 and the DLNA gateway 2 can perform data transmission using the data channel negotiated by the XMPP:JINGLE, and the DLNA gateway 2 and the DMR can interact using a standard HTTP protocol. In such case, the DLNA gateway 1 and the DLNA gateway 2 can perform a protocol transformation work, to transform the data in the data channel into HTTP protocol encapsulation, and then transform the HTTP protocol into a data encapsulation format of the data channel. Such process is transparent to the device of the DLNA network, and the device of the DLNA network needs not to know the protocol transformation process. For example, in the second DLNA network, the protocol for accessing the DLNA device is an HTTP protocol, and the HTTP protocol can be transformed into a UDP protocol on the DLNA gateway. The first DLNA network and the second DLNA network negotiate a UDP channel through an XMPP protocol, which is used to implement communication between the virtual DMS/DMR device and the DLNA gateway, thereby achieving the purpose of accessing the actual DLNA device.

In another embodiment, software is further provided for implementing the technical schemes described in above embodiments and preferable embodiments.

In another embodiment, a storage medium is further provided, which stores the above software and includes but is not limited to an optical disc, a floppy disk, hardware, an erasable memory, etc.

A person having ordinary skill in the art can understand that all or a part of steps in the above method can be implemented by programs instructing related hardware, and the above programs can be stored in a computer readable storage medium, such as a read-only memory, disk or disc etc. Alternatively, all or a part of steps in the above embodiments can also be implemented by one or more integrated circuits. Accordingly, each module/unit in the above embodiments can be implemented in a form of hardware, or can also be implemented in a form of software functional module. The embodiments of the present invention are not limited to any particular form of a combination of hardware and software.

The above embodiments are merely used to describe the technical solutions of the present application without limitation, and the present application is merely described in detail with reference to preferable embodiments. Those skilled in the art should understand that without departing from the spirit and scope of technical solutions of the present application, any modification or equivalent substitution which is made to the technical solutions of the present application should belong to the scope of the claims of the present application.

INDUSTRIAL APPLICABILITY

With the embodiments of the present invention, a data channel is established between a first DLNA gateway in a first DLNA network and a second DLNA gateway in a second DLNA network, wherein the DLNA gateway is a DLNA device having a DMC function and capable of accessing the Internet; a virtual DLNA device corresponding to a DLNA device in the first DLNA network is added in the second DLNA gateway; and a DLNA device in the second DLNA network performs remote control and/or remote play for the DLNA device in the first DLNA network through the virtual DLNA device. This solves the problem in related technologies that DLNA sharing is only limited in a local range, implements cross-network remote control and remote play, expands a sharing range of the DLNA network, and improves the user experience.

What we claim is:

1. A method for sharing a Digital Living Network Alliance (DLNA) device, comprising:
    establishing a data channel between a first DLNA gateway in a first DLNA network and a second DLNA gateway in a second DLNA network, wherein each of the first DLNA gateway and the second DLNA gateway is a DLNA device having a Digital Media Controller (DMC) function and capable of accessing the Internet;
    adding, in the second DLNA gateway, a virtual DLNA device corresponding to a DLNA device in the first DLNA network; and
    a DLNA device in the second DLNA network performing remote control and/or remote play for the DLNA device in the first DLNA network through the virtual DLNA device; wherein
    the step of adding comprises:
    the first DLNA gateway transmitting a Simple Service Discovery Protocol (SSDP) message broadcasted by the DLNA device in the first DLNA network to the second DLNA gateway through the data channel; and the second DLNA gateway amending the SSDP message, and broadcasting the amended SSDP message in the second DLNA network;

wherein, the step of establishing the data channel between the first DLNA gateway in the first DLNA network and the second DLNA gateway in the second DLNA network comprises:

establishing the data channel between the first DLNA gateway and the second DLNA gateway through an Extensible Messaging and Presence Protocol (XMPP) server;

wherein, establishing the data channel between the first DLNA gateway and the second DLNA gateway through the XMPP server comprises:

the first DLNA gateway and the second DLNA gateway logging in the XMPP server using the same account; and the first DLNA gateway and the second DLNA gateway establishing the data channel.

2. The method according to claim 1, wherein, the step of a DLNA device in the second DLNA network performing remote control and/or remote play for the DLNA device in the first DLNA network through the virtual DLNA device comprises:

in a case that the DLNA device in the second DLNA network controls the virtual DLNA device, the second DLNA gateway controlling the virtual DLNA device through the data channel; and/or in a case that the DLNA device in the second DLNA network plays media resources in the virtual DLNA device, the second DLNA gateway acquiring the media resources of the DLNA device in the first DLNA network corresponding to the virtual DLNA device through the data channel and playing the media resources.

3. The method according to claim 1, further comprising:
the first DLNA gateway and/or the second DLNA gateway logging out the account; and
the second DLNA gateway broadcasting that the virtual DLNA device leaves the second DLNA network in the second DLNA network through an SSDP message.

4. The method according to claim 1, wherein, the SSDP message broadcasted by the DLNA device in the first DLNA network comprises a first Uniform Resource Locator (URL) within the first DLNA network of the DLNA device in the first DLNA network, and the second DLNA gateway amending the SSDP message and broadcasting the amended SSDP message in the second DLNA network comprises:

the second DLNA gateway amending the first URL in the SSDP message broadcasted by the DLNA device in the first DLNA network to a second URL within the second DLNA network of the second DLNA gateway as a URL of the virtual DLNA device, and broadcasting the amended SSDP message in the second DLNA network.

5. The method according to claim 1, wherein, the data channel is a UDP based data channel.

6. An apparatus for sharing a Digital Living Network Alliance (DLNA) device located in a second DLNA gateway of a second DLNA network, comprising hardware performing instructions stored in a non-transitory computer readable medium which executes steps in the following modules:

an establishment module, configured to establish a data channel with a first DLNA gateway in a first DLNA network, wherein each of the first DLNA gateway and the second DLNA gateway is a DLNA device having a Digital Media Controller (DMC) function and capable of accessing the Internet;

a processing module, configured to add a virtual DLNA device corresponding to a DLNA device in the first DLNA network; and a remote operating module, configured for the DLNA device in the second DLNA network to perform remote control and/or remote play for the DLNA device in the first DLNA network through the virtual DLNA device; wherein the processing module comprises:
a reception module, configured to receive a Simple Service Discovery Protocol (SSDP) message broadcasted by the DLNA device in the first DLNA network transmitted by the first DLNA gateway through the data channel;
a first transformation module, configured to amend the SSDP message and broadcast the amended SSDP message in the second DLNA network;

wherein, the establishment module comprises:
a login unit, configured to log in an Extensible Messaging and Presence Protocol (XMPP) server using a same account as that of the first DLNA gateway; and
an establishment unit, configured to establish the data channel with the first DLNA gateway.

7. The apparatus according to claim 6, wherein, the remote operating module comprises:
a remote control unit, configured to control the virtual DLNA device through the data channel in a case that the DLNA device in the second DLNA network controls the virtual DLNA device; and/or
a remote play unit, configured to acquire the media resources of the DLNA device in the first DLNA network corresponding to the virtual DLNA device through the data channel and play the media resources in a case that the DLNA device in the second DLNA network plays media resources in the virtual DLNA device.

8. The apparatus according to claim 7, further comprising:
a logout module, configured to log out the account; and
a broadcast module, configured to broadcast that the virtual DLNA device leaves the second DLNA network in the second DLNA network through an SSDP message.

9. The apparatus according to claim 6, wherein the SSDP message comprises a first Uniform Resource Locator (URL) within the first DLNA network of the DLNA device in the first DLNA network, and the first transformation module is configured to amend the first URL in the SSDP message to a second URL within the second DLNA network of the second DLNA gateway as a URL of the virtual DLNA device, and broadcast the amended SSDP message in the second DLNA network.

10. The method according to claim 2, wherein, the data channel is a UDP based data channel.

11. The apparatus according to claim 7, wherein, the processing module further comprises:
an adding module, configured to add the virtual DLNA device corresponding to the DLNA device;
wherein in a case that the SSDP message comprises a first Uniform Resource Locator (URL) within the first DLNA network of the DLNA device in the first DLNA network, the first transformation module amends the first URL in the SSDP message to a second URL within the second DLNA network of the second DLNA gateway as a URL of the virtual DLNA device.

12. The method according to claim 1, wherein the method further comprises:

upon a newly added DLNA device in the first DLNA network, the first DLNA gateway transforming an additional SSDP message broadcasted by the newly added DLNA device in the first DLNA network from a multicast message into a unicast message, and transmitting the additional SSDP message to the second DLNA gateway through the data channel; and after receiving the additional SSDP message, the second DLNA gateway adding a virtual DLNA device corresponding to the newly added DLNA device, transforming the additional SSDP message from a unicast message into a multicast message, and broadcasting the additional SSDP message in the second DLNA network to notify a DLNA device in the second DLNA network that there is the newly added DLNA device in the first DLNA network.

13. The apparatus according to claim 6, wherein the hardware further performs the instructions for executing the following steps:

upon a newly added DLNA device in the first DLNA network, transforming, by the first DLNA gateway, an additional SSDP message broadcasted by the newly added DLNA device in the first DLNA network from a multicast message into a unicast message, and transmitting the additional SSDP message to the second DLNA gateway through the data channel; and adding, by the second DLNA gateway after receiving the additional SSDP message, a virtual DLNA device corresponding to the newly added DLNA device, transforming the additional SSDP message from a unicast message into a multicast message, and broadcasting the additional SSDP message in the second DLNA network to notify a DLNA device in the second DLNA network that there is the newly added DLNA device in the first DLNA network.

14. The method according to claim 5, wherein, the step of the DLNA device in the second DLNA network performing remote control and/or remote play for the DLNA device in the first DLNA network through the virtual DLNA device comprises:

the second DLNA gateway transforming a message for remote control and/or remote play transmitted by the DLNA device in the second DLNA network to the virtual DLNA device from a Hypertext Transfer Protocol (HTTP) format into a UDP format, and transmitting the transformed message to the first DLNA gateway through the data channel; and the second DLNA gateway transforming a response message corresponding to the message returned by the first DLNA gateway from the UDP format into the HTTP format, and forwarding the transformed response message to the DLNA device performing remote control and/or remote play.

15. The apparatus according to claim 6, wherein, in a case that the data channel is a User Datagram Protocol (UDP) based data channel, the remote operating module comprises:

a second transformation module, configured to transform a message for remote control and/or remote play transmitted by the DLNA device in the second DLNA network to the virtual DLNA device from a Hypertext Transfer Protocol (HTTP) format into a UDP format, and transmit the transformed message to the first DLNA gateway through the data channel; and further configured to transform a response message corresponding to the message returned by the first DLNA gateway from the UDP format into the HTTP format, and forward the transformed response message to the DLNA device performing remote control and/or remote play.

* * * * *